United States Patent [19]

Kalmar

[11] 4,006,259
[45] Feb. 1, 1977

[54] PRESERVATIVE COATING FOR FRUITS AND VEGETABLES

[75] Inventor: Arthur F. Kalmar, Riverside, Calif.

[73] Assignee: FMC Corporation, Philadelphia, Pa.

[22] Filed: Apr. 1, 1975

[21] Appl. No.: 564,145

[52] U.S. Cl. .............................. 426/308; 426/333; 426/335; 424/38; 426/310
[51] Int. Cl.$^2$ ......................................... A23B 7/14
[58] Field of Search .......... 426/310, 335, 308, 654, 426/532, 333; 260/309.2; 106/271; 427/155, 180, 443; 424/38

[56] References Cited

UNITED STATES PATENTS

| | | | |
|---|---|---|---|
| 3,017,415 | 1/1962 | Sarett | 260/302 |
| 3,631,176 | 12/1971 | Klopping | 260/309.2 |
| 3,662,069 | 5/1972 | Dittmar | 424/273 |

OTHER PUBLICATIONS

Plant Disease Reporter, Jan. 1967, vol. 51, No. 1, Harding.

Primary Examiner—Hiram H. Bernstein
Attorney, Agent, or Firm—R. D. Jackson; E. G. Seems; P. Newman

[57] ABSTRACT

Fresh fruits and vegetables are preserved by coating them with a waxy protective adhering film formed by spraying the fruits and vegetables with a volatile petroleum solvent solution of a waxy film-forming material and an alkyl aryl sulfonic acid solution of a fungicidal benzimidazole of the formulae

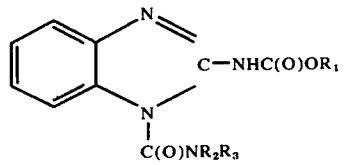

wherein
$R_1$ is methyl, ethyl, isopropyl or sec-butyl;
$R_2$ is hydrogen, alkyl of 1 to 6 carbon atoms or alkenyl of 3 to 6 carbon atoms and
$R_3$ is alkyl of 1 to 12 carbon atoms;

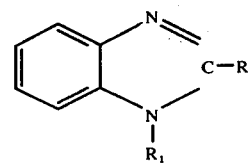

wherein
R is a five-membered heterocyclic ring containing nitrogen and sulfur and
$R_1$ is hydrogen, lower alkyl of 1 to 5 carbon atoms or lower alkenyl of 3 to 6 carbon atoms and

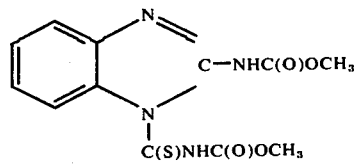

and allowing the solvent to evaporate. Excellent protection against fungi is attained by using benomyl or thiabendazole as the benzimidazole fungicide.

3 Claims, No Drawings

PRESERVATIVE COATING FOR FRUITS AND VEGETABLES

This invention relates to the preservation of fruits and vegetables, particularly, by means of a protective film.

It is a well known commercial practice to preserve perishable foods such as fruits and vegetables by coating them with a protective film. The usual procedure for applying the film consists of spraying the freshly picked produce with a solvent solution of waxy material and allowing the solvent to evaporate. The resulting adherent waxy layer is effective in retarding spoilage and dehydration. By incorporating a fungicide in the spray formulation, the film is effective in controlling mold growth and sporulation.

An especially active class of fungicides are certain substituted benzimidazoles of the following formulae:

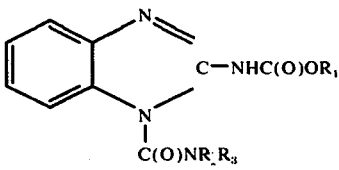

wherein
R is methyl, ethyl, isopropyl or sec-butyl;
$R_2$ is hydrogen, alkyl of 1 to 6 carbon atoms or alkenyl of 3 to 6 carbon atoms and
$R_3$ is alkyl of 1 to 12 carbon atoms.
A particularly active and preferred member of formula I is

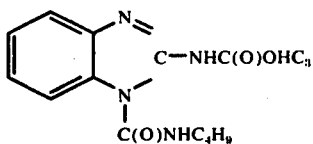

having the name methyl 1-butylcarbamoyl-2-benzimidazole-carbamate, and commonly called benomyl.

Another particularly active and preferred member of formula I is

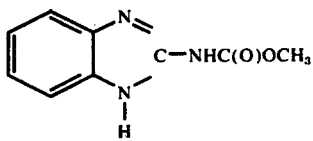

having the name methyl 2-benzimidazolecarbamate.

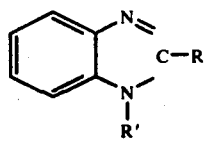

wherein
R is a five-membered heterocyclic ring containing nitrogen and sulfur;
R' is hydrogen, lower alkyl of 1 to 5 carbon atoms or lower alkenyl of 3 to 5 carbon atoms
A preferred member of formula II is

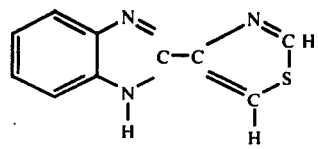

having the name 2-(4-thiozolyl)-benzimidazole and commonly called thiabendazole.

The benzimidazoles of formulae I, II and III are known chemical entities, the description and preparation of which are set forth in U.S. Pat. Nos. 3,631,176, 3,017,415 and 3,631,176 respectively.

One of the physical characteristics of these benzimidazoles is a pronounced low solubility in the petroleum type solvents commonly used in formulating coating compositions for applying protective waxy films to fruits and vegetables. Such behavior is well documented. For instance, in the journal "Plant Disease Reporter," vol. 51, No. 1 of January, 1967, at page 51, it is reported that thiabendazole, a preferred benzimidazole fungicide as above noted, is essentially insoluble in petroleum distillate solvents. As a consequence, resin or wax solutions of this solvent could not be used to prepare coating compositions containing this benzimidazole. To overcome this difficulty, the authors formed protective films on oranges by treating them with a blend of toluene and ethanol containing dissolved resin and thiabendazole. However, the toluene tended to burn and pit the fruit rind. The article concluded with the statement that finding a satisfactory solvent suitable for applying resin films with thiabendazole to fruit is not a simple one.

Manifestly, the development of a satisfactory method for utilizing this unusually active class of fungicidal compounds in protective waxy films has not been realized.

It has now been discovered that such benzimidazoles are highly soluble in an alkyl aryl sulfonic acid and that the resulting acid solutions, preferably containing a cosolvent of the class monohydroxy alkanols of 1 to 4 carbon atoms; a saturated aliphatic ketone of 3 to 5 carbon atoms; a lower N,N-dialkyl lower aliphatic amide wherein the alkyls have 1 to 2 carbon atoms, or N-methyl-2-pyrrolidone, containing by weight from about 1.0% to about 30.0% of the benzimidazole readily dissolve in the petroleum solvent coating compositions used in applying protective waxy films to fruits and vegetables, and the provision of such coating compositions containing the ingredients aforesaid and protective waxy films produced therefrom constitute the principal object and purpose of the invention. Another object of the invention is to provide a method of solubilizing the benzimidazoles aforesaid by dissolving them in an alkyl aryl sulfonic acid and to the acid solutions produced thereby. Other objects and purposes will be apparent in the ensuing description.

In carrying out the invention, the benzimidazole and alkyl aryl sulfonic acid are mixed together at about room temperature, desirably with mechanical stirring. Such is the high solubility of the benzimidazole in the sulfonic acid that dissolution is complete in a short time, usually after a few minutes. Elevated temperatures increase the rate of dissolution but care should be taken to avoid thermal decomposition. Generally speaking, the benzimidazoles are quite soluble in the sulfonic acid at about room temperature so that sufficiently concentrated solutions can be obtained without the need to use elevated temperatures. Desirably, the alkyl aryl sulfonic acid should produce solutions of the benzimidazole having the concentrations aforesaid which are liquid at room temperature.

The alkyl aryl sulfonic acids which are effective in solubilizing the substituted benzimidazoles herein are the so-called broad cut alkyl aryl sulfonic acids having a chain length averaging from 8 to about 18 carbon atoms; specific members of this class of compounds include octyl, nonyl, decyl, undecyl, dodecyl, tridecyl, tetradecyl, pentadecyl, hexadecyl, heptadecyl and octadecylbenzenesulfonic acid. A broad cut $C_{12}$ or dodecylbenzenesulfonic acid is preferred.

Representative waxy materials which are suitable in practicing the invention are the type normally used to form protective films on fruits and vegetables by deposition from a solvent solution. Exemplary film formers include coumarone-indene resins, phenolic resins, petroleum hydrocarbon resins, terpene resins, calcium salts of partially dimerized rosin and other modified rosins, paraffin wax and spermacetti wax.

The volatile solvent employed for dissolution of the waxy material and the solubilized benzimidazole is preferably a petroleum distillate. Where the coating is to be applied as a spray, a solvent having an initial boiling point of about 220° F and a final boiling point of about 370° F is preferred. The characteristic of the solvent employed is that it should be sufficiently volatile to evaporate from the spray applied coating in less than about 30 seconds. For example, in treating citrus fruit by the herein process, petroleum solvents having boiling points respectively in the ranges of 180° F to 320° F and 220° F to 370° F, have been employed. Generally, at least about 90% of the solvent should have a boiling point below about 300° F.

Because of its corrosive nature, the concentrated solution of the benzimidazole in sulfonic acid is kept in a separate corrosion resistant container and means provided for injecting the proper proportion of the concentrate into the petroleum solvent solution of waxy material, and discharging the mixture through a spray nozzle. In the coating solution applied to the fruit, the ratio of the 10% benzimidazole concentrate to waxy material solution can be anywhere from 1 to 500 to 1 to 10 to produce a benzimidazole concentration of from about 0.02% by weight to about 1.0% by weight; the alkyl aryl sulfonic acid concentration is from about 0.03% by weight to about 0.2% by weight; the concentration of the waxy material is about 1.0% by weight to about 20% by weight; the concentration of the petroleum solvent is from about 98.87% by weight to about 52.0% by weight; and the concentration of the cosolvent is from about 25% by weight to about 0.15% by weight. It is possible by this injection system to vary the concentration of the fungicidal benzimidazole required in the coating composition depending upon the degree of decay and sporulation control required. If no decay control treatment is desired on some lots of fruit because of the economics involved, the injection of fungicide concentrate can be turned off and only the waxy material applied to the fruit. It has been determined that by the process of the present invention, the waxy material is so deposited on the surface of the fruit that the evaporation of moisture from the fruit is reduced to about 30% to 60% as compared with the moisture that would be lost if the fruit was marketed without the surface coating. Moreover, the waxy material coating also improves the appearance of the fruit by imparting a desirable gloss.

In making up a concentrate of the benzimidazole in sulfonic acid it is desirable to include a cosolvent for the benzimidazole which will reduce the viscosity of the preparation to a pumpable fluid. Typical cosolvents are the monohydroxy alkanols of 1 to about 4 carbon atoms, saturated aliphatic ketones from 3 to about 5 carbon atoms and lower N,N-dialkyl, lower aliphatic amides, particularly dimethylacetamide and dimethylformamide and N-methyl-2-pyrrolidone. The cosolvent preferred herein for economical and volatility reasons is a mixture of methyl and isopropyl alcohol. Also suitable is a mixture of acetone and ethyl alcohol. Moreover, the incorporation of a cosolvent which is soluble in both petroleum solvent and water has the additional function of coupling any water which might be present in the composition including water present in the sulfonic acid with petroleum solvent to provide and maintain compositions stable against phase separation. Water may be introduced during manufacture of such acids or when they are stored in tanks vented to the atmosphere. The presence of a water phase in the composition extracts the sulfonic acid from the petroleum solvent thereby retarding solulization of the benzimidazole in the solvent. A small amount of a mixture of methyl and isopropyl alcohol added to the composition prevents the formation of a water phase.

Application of the Coating Composition

The coating compositions of the invention are applied to the fruit and vegetables in the form of a finely atomized spray which is the usual treatment for producing protective films thereon. As previously pointed out, the acid solution of the benzimidazole is desirably retained in a separate corrosion resistant chamber and mixed with the wax or resin solution just prior to application. A spray device suitable for applying the coating compositions of the invention is described in U.S. Pat. Nos. 2,212,621 to Sharma and 2,342,063 to Sells et al.

Typically, the coating composition is applied using a No. 4.00 Monarch nozzle operating at a pressure of 40 p.s.i. With this size nozzle and pressure the output is 2.64 gallons per hour. This quantity of coating solution will treat about 22,000 pounds of oranges. Monarch nozzles are designed to produce an extremely fine spray when operated at a hydraulic pressure of 20 to 100 p.s.i. The wax spraying machine has a chamber, open at each end. A roller conveyor moving at a speed of about 54 feet per minute carries the fruit through the chamber while the rollers continually turn the fruit on all axes. The waxy material solution is sprayed down upon the fruit in a highly atomized form. Monarch is the trade name for atomizing nozzles manufactured by Monarch Mfg. Works, Inc., of Philadelphia.

The following examples illustrate the practice of the invention wherein all proportions are on a weight basis.

EXAMPLE 1

A concentrated solution of a benzimidazole in an alkyl benzene sulfonic acid and cosolvent was prepared having the following composition:

| | |
|---|---|
| 2-(4-thiazolyl) benzimidazole (Thiabendazole) | 10.0% by wt. |
| Dodecyl benzene sulfonic acid (Calsoft LAS-99*) | 20.0% by wt. |
| Methyl alcohol | 35.0% by wt. |
| Isopropyl alcohol | 35.0% by wt. |
| Total | 100.0% by wt. |

* A broad cut dodecylbenzenesulfonic acid having the following specifications:

| Composition | |
|---|---|
| Sulfonic Acid: % Active | 97.5 |
| Moisture Content: % | 0.5 |
| Sulfuric Acid: % | 0.9 |
| Specific Gravity at 20° C | 1.06 |

Calsoft LAS-99 is a product of the Pilot Chemical Company. The alkyl portion consists predominately of $C_{11}$ and $C_{12}$ carbon atoms. The typical distribution is as follows:

| Isomer Content of the Alkyl Side Chain | |
|---|---|
| $C_9$ | 0.2% |
| $C_{10}$ | 12.3% |
| $C_{11}$ | 43.9% |
| $C_{12}$ | 37.6% |
| $C_{13}$ | 5.6% |
| $C_{14}$ | 0.3% |

A solution of coumarone-indene resin in petroleum solvent was prepared having the following composition:

| | |
|---|---|
| Nevindene R-3 Resin | 12.0% by wt. |
| Shell Sol. MX16-66 | 83.0% by wt. |
| Shell TS-28 | 5.0% by wt. |
| Total | 100.0% |

The preservative composition for application to the surface of citrus fruits was prepared by mixing 2.5 parts by weight of the 10% thiabendazole concentrate with 97.5 parts by weight of the 12% Nevindene R-3 resin solution. This mixture was applied to oranges by means of the aforedescribed spraying process. Approximately 50 parts per million of resin and 1.0 part per million thiabendazole were applied on each orange; that is, for each orange of approximately 100 grams weight, approximately 0.005 grams of resin and 0.0001 gram of thiabendazole was applied.

Nevindene is a trade name for a class of coumaroneindene resins which are essentially hydrocarbon, except for a slight quantity of oxygen content probably due to coumarone polymers; traces of other elements may be present.

The resins are essentially inert, non-acidic, non-basic, and non-saponifiable. They show less than 0.1% ash, are completely soluble in aromatic solvents, tolerably soluble in mineral spirits, and relatively insoluble in paraffinic solvents. They exhibit molecular weights of 600 – 800 by the boiling point evaluation method; Menzies-Wright, JACS, 43, 2311 (1921). Refractive Indices at 20° – 25° C are in the range 1.62 – 1.64. Densities at 20° – 25° C are in the range 1.12 – 1.14. Iodine numbers by a variety of methods indicate a very low order of reactivity and the resins show little unsaturation.

Nevindene R-3 resin has a molecular weight of 760; average softening point (Ring and Ball; ASTM E28-51T) of 127.8° C and resin-mineral spirits solubility averaging 42° C.

Shell Sol. MX16-66, a solvent sold by the Shell Oil Company, has the following properties:

| | |
|---|---|
| Gravity, °API | 52.1 |
| Specific Gravity, 60° F | 0.771 |
| Pounds Per Gallon | 6.42 |
| Aniline Point, ° F | 104.1 |
| Kauri Butanol Value | 45.8 |
| Aromatic Hydrocarbons, Vol. % | 16.6 |
| Distillation D-86, ° F | |
| Initial Boiling Point | 221 |
| 5% Recovered | 231 |
| 10% " | 233 |
| 20% " | 236 |
| 30% " | 238 |
| 40% " | 241 |
| 50% " | 245 |
| 60% " | 249 |
| 70% " | 254 |
| 80% " | 260 |
| 90% " | 268 |
| 95% " | 272 |
| Dry Point | 281 |

Shell TS-28 solvent, a product of the Shell Oil Co., has the following properties:

| | Specimen 1 | Specimen 2 |
|---|---|---|
| Gravity, °API ASTM D-287 | 33.9 | 36.5 |
| Gravity, Specific 60/60° F | 0.8555 | 0.8423 |
| Pounds per Gallon | 7.12 | 7.01 |
| Color, Saybolt ASTM D-156 | 30+ | 30+ |
| Flash, Tag O.C., ° F ASTM D-1310 | 120 | 122 |
| Flash, Tag C.C., ° F ASTM D-56 | 112 | 111 |
| Sulfur, %w, ASTM D-1266 | 0.06 | 0.23 |
| Doctor Test | Passes | Passes |
| Corrosion, Copper at 212° F ASTM D-130 | Passes | Passes |
| Kauri Butanol Number ASTM D-1133 | 72 | 66 |
| Mixed Aniline Point, ° F ASTM D-611 | 95 | 99 |
| Distillation, ° F ASTM D-1078 | | |
| IBP | 321 | 319 |
| 10% Distilled | 331 | 324 |
| 50% Distilled | 350 | 332 |
| 90% Distilled | 376 | 348 |
| End Point | 398 | 375 |

EXAMPLE 2

A concentrated solution of a benzimidazole in an alkyl benzene sulfonic acid and cosolvent was prepared having the following composition:

| | |
|---|---|
| Methyl 1-butylcarbomoyl-2-benzimidazole carbamate (90% purity) (Benomyl) | 11.1% by wt. |
| Dodecyl benzene sulfonic acid | 20.0% by wt. |

| | |
|---|---|
| Methyl alcohol | 40.0% by wt. |
| Isopropyl alcohol | 29.9% by wt. |
| Total | 100.0% by wt. |

A solution of 10% modified resin known commercially as Limed Poly-pale in petroleum solvent was prepared having the following composition:

| | |
|---|---|
| Limed Poly-pale resin | 10.0% by wt. |
| Shell Sol. MX16-66 | 90.0% by wt. |
| Total | 100.0% by wt. |

The preservative composition for application to the surface of lemons was prepared by mixing 1 part by weight of the benomyl concentrate with 99 parts by weight of the 10% Limed Poly-pale solution. This solution was applied to lemons using the coating procedure aforesaid. Approximately 70 parts per million of resin and 0.56 parts per million of benomyl were applied on each lemon.

Limed Poly-pale resin is a limed polymerized rosin having the following properties:

| | |
|---|---|
| Acid Number | 55 |
| Softening point: | |
| ASTM E28 Ball and Ring | 162° C |
| | 323° F |
| Benzene Insoluble | 0.05% maximum |
| Color, Gardner (50% solution in toluene) ASTM D-1544 | 13 |
| Density at 20° C (68° F) | 1.097 |
| Weight per U.S. gallon | 9.15 pounds |

EXAMPLE 3

A preservative composition was prepared having the following composition:

| | |
|---|---|
| 2-(4-thiazolyl) benzimidazole (Thiabendazole) | 0.40 % by wt. |
| Dodecyl benzene sulfonic acid | 0.80% by wt. |
| Nevindene LX 509 resin | 15.0 % by wt. |
| Methyl Alcohol | 3.0 % by wt. |
| Isopropyl Alcohol | 4.0 % by wt. |
| Chevron Solvent No. 2 | 10.0 % by wt. |
| Shell TS-28 | 10.0 % by wt. |
| Shell Sol. MX16-66 | 56.8 % by wt. |
| Total | 100.0 % % by wt. |

This preservative composition was applied to oranges using the coating procedure aforesaid. Approximately 64 parts per million of resin and 1.6 parts per million of thiabendazole were applied on each orange.

Results of tests using the solutions prepared and applied in accordance with the foregoing examples indicate that the protective coatings herein are effective in simultaneously controlling decay on fresh fruit and inhibiting sporulation of molds growing on such fruit. Fungi against which the benzimidazole compounds of this invention are active may be represented by, but is not intended to be limited to, the following: Penicillium digitatum, Penicillium italicum, Penicillium expansum, Monilinia fructicola, Botrytis cinerea, Fusarium solani, Sclerotinia sclerotiorum and Cladosporium herbarum.

Chevron Solvent No. 2, sold by the Chevron Company, has the following properties:

| | |
|---|---|
| Gravity, °API | 53.3 |
| Specific Gravity, 60° F | 0.766 |
| Pounds Per Gallon | 6.38 |
| Aniline Point, ° F | 102.1 |
| Kauri Butanol Value | 45.4 |
| Aromatic Hydrocarbons, Vol. % | 19.8 |
| Distillation D-86, ° F | |
| Initial Boiling Point | 212 |
| 5% Recovered | 222 |
| 10% " | 224 |
| 20% " | 226 |
| 30% " | 229 |
| 40% " | 232 |
| 50% " | 236 |
| 60% " | 240 |
| 70% " | 246 |
| 80% " | 257 |
| 90% " | 272 |
| 95% " | 284 |
| Dry Point | 296 |

Nevindene LX 509 resin is another of the Nevindene resins class as defined in Example 1. LX 509 has the following properties: softening point (Ring and Ball: ASTM E-28-51T) of 155° – 158° C; Resin-Mineral Spirits Solubility of 90° – 105° C; Specific Gravity at 25/15.6 of 1.1401 and Refractive Index $n$ 30/D of 1.6251.

What is claimed is:

1. A method of preserving fresh fruits and vegetables comprising coating them with a waxy protective adhering film formed by treating the fruits and vegetables with a volatile petroleum solvent solution having dissolved therein a waxy film forming material and an alkyl aryl sulfonic acid solution of a fungicidal benzimidazole selected from the class consisting of:

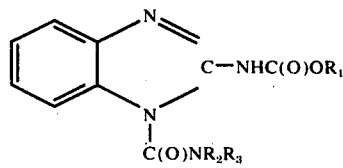

I.

wherein
$R_1$ is methyl, ethyl, isopropyl or sec-butyl;
$R_2$ is hydrogen, alkyl of 1 to 6 carbon atoms or alkenyl of 3 to 6 carbon atoms and
$R_3$ is alkyl of 1 to 12 carbon atoms;

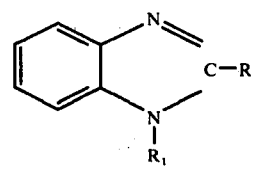

II.

wherein
R is a five-membered heterocyclic ring containing nitrogen and sulfur and
$R_1$ is hydrogen, lower alkyl of 1 to 5 carbon atoms or lower alkenyl of 3 to 6 carbon atoms and

III.

and allowing the solvent to evaporate.

2. The method according to claim 1 wherein the alkyl aryl sulfonic acid is dodecylbenzenesulfonic acid.

3. The method according to claim 1 wherein the alkyl aryl sulfonic acid solution contains a cosolvent selected from the class consisting of a monohydroxy alkanol of 1 to 4 carbon atoms, an aliphatic saturated ketone of 3 to 5 carbon atoms, a lower N,N-dialkyl lower aliphatic amide wherein the lower alkyl is 1 to 2 carbon atoms and N-methyl-2-pyrrolidone.

* * * * *

UNITED STATES PATENT OFFICE
CERTIFICATE OF CORRECTION

PATENT NO. : 4,006,259
DATED : February 1, 1977
INVENTOR(S) : Arthur F. Kalmar

It is certified that error appears in the above-identified patent and that said Letters Patent are hereby corrected as shown below:

Column 1, line 39, formula I,

" 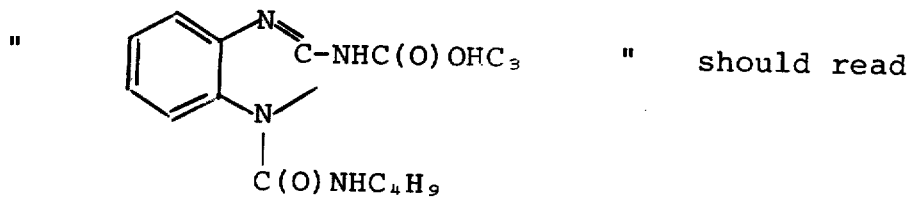 " should read

-- 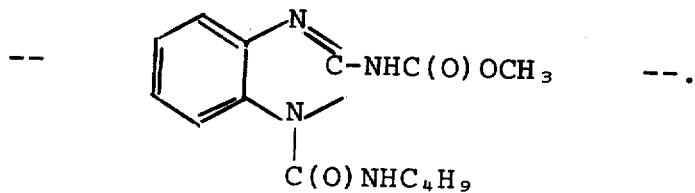 --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*